United States Patent [19]

Ranka et al.

[11] Patent Number: 4,642,323

[45] Date of Patent: Feb. 10, 1987

[54] PROCESS FOR PREPARING LATEX POLYMERS FROM GASEOUS MONOMERS

[75] Inventors: Ajay I. Ranka, Allison Park; Suryya K. Das, Pittsburgh, both of Pa.

[73] Assignee: PPG Industries, Inc., Pittsburgh, Pa.

[21] Appl. No.: 814,459

[22] Filed: Dec. 30, 1985

[51] Int. Cl.⁴ ............................................. C08K 3/20
[52] U.S. Cl. ................................................. 524/458
[58] Field of Search ........................................ 524/458

[56] References Cited

U.S. PATENT DOCUMENTS

| 3,226,350 | 12/1965 | Smith et al. | 524/747 |
| 3,324,097 | 6/1967 | Pears | 526/212 |
| 3,882,195 | 5/1975 | Daniels et al. | 526/201 |
| 4,064,087 | 12/1977 | Das | 525/286 |
| 4,151,143 | 4/1979 | Blank et al. | 524/533 |
| 4,440,897 | 4/1984 | Maska | 524/460 |
| 4,507,425 | 3/1985 | Weaver | 524/460 |

FOREIGN PATENT DOCUMENTS

| 0096103 | 12/1983 | European Pat. Off. | 524/458 |
| 2709876 | 9/1977 | Fed. Rep. of Germany | 524/458 |
| 59-59369 | 10/1985 | Japan . | |
| 1243051 | 8/1971 | United Kingdom | 524/458 |
| 1462984 | 1/1977 | United Kingdom | 524/458 |
| 2145099 | 3/1985 | United Kingdom | 524/458 |

*Primary Examiner*—Joseph L. Schofer
*Assistant Examiner*—N. Sarofim
*Attorney, Agent, or Firm*—William J. Uhl

[57] ABSTRACT

A process for preparing a latex polymer from a monomer component which includes one or more gaseous monomers is disclosed. The process comprises pre-emulsifying the monomer component prior to its polymerization and adding the pre-emulsified monomer component incrementally to a reactor for polymerization.

5 Claims, No Drawings

PROCESS FOR PREPARING LATEX POLYMERS FROM GASEOUS MONOMERS

BACKGROUND OF THE INVENTION

1. Field of the Invention

The present invention relates to the preparation of polymers from the polymerization of alpha, beta-ethylenically unsaturated monomers via aqueous latex polymerization techniques. More particularly, this invention relates to the aqueous latex polymerization of alpha, beta-ethylenically unsaturated monomers which includes at least one gaseous monomer.

2. Brief Description of the Prior Art

The polymerization of alpha, beta-ethylenically unsaturated monomers via aqueous latex polymerization techniques is well known in the art. The polymerization is conducted in aqueous medium in the presence of an emulsifying agent which may be a low molecular weight material such as a low molecular weight anionic material, for example, the alkali metal or ammonium salt of sulfates of alcohols having from 8 to 18 carbon atoms, specifically, sodium lauryl sulfate. Polymerization can also be conducted in the presence of a polymeric surfactant such as an anionic polymer, for example, an ammonia or amine-neutralized carboxylic acid group-containing acrylic polymer. This is shown, for example, in U.S. Pat. No. 4,064,087 to Das and U.S. Pat. No. 4,151,143 to Blank.

Among the polymerizable alpha, beta-ethylenically unsaturated monomers which may be polymerized are, of course, the normally liquid monomers such as the alkyl esters of acrylic and methacrylic acid, for example, methyl methacrylate and butyl acrylate; vinyl aromatic compounds such as styrene and vinyl toluene; and other assorted vinyl monomers such as vinyl acetate and acrylonitrile which polymerize quite readily. Gaseous monomers such as vinyl chloride and ethylene are difficult to polymerize via aqueous emulsion polymerization techniques. The monomers are added incrementally to the polymerizing reaction mixture and the monomer addition and reaction times are long because of excessive pressure build-up in the reactor. In this instance, the rate of gaseous monomer addition must be reduced or even stopped until the monomers polymerize and the pressure drops.

It is an object of the present invention to provide a method of polymerization of gaseous alpha, beta-ethylenically unsaturated monomers via aqueous latex polymerization techniques in a fast and economic manner.

SUMMARY OF THE INVENTION

In accordance with the present invention, a process for preparing a latex polymer which comprises subjecting a polymerizable alpha, beta-ethylenically unsaturated monomer component which includes a gaseous monomer to free radical initiated polymerization conditions in aqueous medium is disclosed. The monomer component is pre-emulsified in aqueous phase prior to polymerization and is added incrementally to a reactor for polymerization.

Pre-emulsification of the gaseous monomer(s) results in a faster reaction enabling the monomer component to be added more quickly to the reactor without an excessive pressure build-up. In addition, pre-emulsifying the monomer component results in a latex polymer with improved coating properties.

DETAILED DESCRIPTION

The gaseous polymerizable alpha, beta-ethylenically unsaturated monomer component comprises a gaseous monomer, or as is more usual, a mixture of alpha, beta-ethylenically unsaturated monomers which includes at least one gaseous monomer. A gaseous monomer is an alpha, beta-ethylenically unsaturated monomer which has a vapor pressure greater than 14.7 psia at a temperature of 10° C. and below. Examples of such gaseous monomers include ethylene, propylene, butadiene, vinyl chloride, vinyl fluoride, vinylidene fluoride, tetrafluoroethylene, and mixtures of such monomers.

In addition to the gaseous monomer, the monomer component usually contains other non-gaseous monomers, i.e. those which are liquid at the conditions of temperature and pressure mentioned above. Preferably, the other monomers are selected from alkyl acrylates and methacrylates, vinyl esters of organic acids, alkyl esters of maleic and fumaric acid and epoxy group-containing alpha, beta-ethylenically unsaturated monomers.

Among the alkyl acrylates and methacrylates which can be used are those which contain from 1 to 20 carbon atoms in the alkyl groups. Examples include methyl acrylate, ethyl acrylate, butyl acrylate, 2-ethylhexyl acrylate, methyl methacrylate, butyl methacrylate, 2-ethylhexyl methacrylate and the like.

Among the vinyl esters which can be used are vinyl acetate, vinyl versatate and vinyl propionate.

Among the esters of maleic and fumaric acid which can be used are dibutyl maleate and diethyl fumarate.

Among the epoxy group-containing alpha, beta-ethylenically unsaturated monomers are glycidyl acrylate, glycidyl methacrylate and allyl glycidyl ether.

Besides the preferred monomers mentioned above, other polymerizable alpha, beta-ethylenically unsaturated monomers can be used and include hydroxy functional monomers such as hydroxyalkyl esters of acrylic and methacrylic acid, for example, hydroxyethyl methacrylate and hydroxypropyl methacrylate; vinyl aromatic compounds such as styrene and vinyl toluene; vinyl ethers and ketones such as methyl vinyl ether and methyl vinyl ketone; nitriles such as acrylonitrile; amides such as acrylamide and methacrylamide and alkoxyalkyl derivatives thereof such as N-butoxymethylmethacrylamide.

The gaseous monomer usually comprises at least 20 percent, preferably from 40 to 100 percent by weight of the monomer component.

The polymerization of the monomers is carried out in aqueous medium in the presence of a surface active agent and free radical initiator via aqueous emulsion polymerization techniques. Among the surface active agents which may be used are polymeric surface active agents.

The polymeric surfactants are acid-containing polymers which can be neutralized or partially neutralized with an appropriate basic compound to form a salt which can be dissolved or stably dispersed in aqueous medium.

Examples of suitable acid-containing polymers are acid-containing acrylic polymers which are well known in the art and are prepared by polymerizing an unsaturated acid, preferably an alpha, beta-ethylenically unsaturated carboxylic acid with at least one other polymerizable monomer. The unsaturated acid contains at least one polymerizable double bond and at least one acid group, preferably one $CH_2=C<$ group, one carboxylic acid group and containing from 3 to 12 carbon atoms. Examples of suitable unsaturated acids include acrylic acid, methacrylic acid, crotonic acid, itaconic acid and $C_1$ to $C_8$ alkyl half-esters of maleic and fumaric acid, including mixtures of acids.

The other polymerizable monomer contains at least one polymerizable double bond, preferably one $CH_2=C<$ group. Examples of suitable polymerizable monomers include alkyl acrylates and methacrylates, vinyl esters and the other polymerizable alpha, beta-ethylenically unsaturated monomers mentioned above in connection with the monomer component.

Polymerization of the monomers is usually conducted by organic solution polymerization techniques in the presence of a free radical initiator as is well known in the art.

The molecular weight of the resulting acid-containing acrylic polymers is usually between about 2000 to 50,000 on a number average molecular weight basis and the polymers have acid numbers of at least 50, usually between about 50 to 250.

The salt or partial salt of the acid-containing polymer is formed by neutralizing or partially neutralizing the acid groups of the polymer with an appropriate basic compound. Suitable basic compounds which may be utilized for this purpose include inorganic bases such as alkali metal hydroxides, for example, sodium or potassium hydroxide or organic bases such as ammonia or a water-soluble amine such as methylethanolamine or diethanolamine.

The degree of neutralization required to form the desired polymer salt may vary considerably depending upon the amount of acid included in the polymer, and the degree of solubility or dispersibility of the salt which is desired. Ordinarily in making the polymer water-dispersible, the acidity of the polymer is at least about 25 percent neutralized with the water-soluble basic compound.

The amount of the low molecular weight surfactant usually varies from 0.5 to 20, preferably 1 to 10 percent by weight based on total weight of polymerizable alpha, beta-ethylenically unsaturated monomer component and the low molecular weight surfactant. When a polymeric surfactant is used, it can be used in higher amounts, typically from 5 to 95, preferably 25 to 75 percent by weight based on total weight of polymerizable alpha, beta-ethylenically unsaturated monomer component and polymeric surfactant.

With regard to the free radical intitiator used in preparing the latex polymer, there may be used one or more peroxides which are known to act as free radical initiators and which are soluble in the aqueous medium. Examples include the persulfates, such as ammonium, sodium and potassium persulfates. Also, oil-soluble initiator may be employed either alone or in addition to the water-soluble initiator. Typical oil-soluble initiators include organic peroxides, such as benzoyl peroxide, t-butyl perbenzoate and tertiary-butyl peroxide, and azo initiators such as azobis-(isobutyronitrile) can also be used.

The amount of free radical initiator required is roughly proportional to the concentration of the monomer component. The usual range is 0.01 to 3, preferably from about 0.05 to 1 percent of the initiator based on the weight of the monomer component.

The polymerization process is carried out continuously with the addition of the monomer component to the reaction zone in an incremental manner as the polymerization proceeds. Additional free radical initiator can also be added as the polymerization proceeds. Typically, the reactor is charged with an appropriate amount of water, surface active agent, free radical initiator and, optionally, a portion of a pre-emulsified monomer charge. The reactor is then heated to the free radical initiation temperature and the remaining portion of the pre-emulsified monomer charge added in a continuous and incremental manner to the reactor.

Pre-emulsification of the monomers can be accomplished in a simple manner by adding the monomers with agitation to a mixture of water and surface active agent in a sealed vessel. In pre-emulsifying the gaseous monomers, the monomers are pumped under pressure and added to the mixture of water and surfactant.

Polymerization is usually conducted at a temperature below 100° C., typically at temperatures between 20° and 85° C. The rate of addition of the pre-emulsified monomer charge depends principally on the polymerization temperature and on the type and amount of monomers being employed. After all the monomer has been added, a final heating is usually done to complete polymerization. The reactor is then cooled and the latex recovered.

The following examples are submitted for the purpose of further illustrating the nature of the present invention and should not be construed as a limitation upon the scope thereof. Unless otherwise indicated, all parts and percentages in the examples are by weight.

EXAMPLES

The following examples, Examples A-C, show the preparation of salts of various carboxylic acid group-containing acrylic polymers which are used in subsequent examples as surface active agents for aqueous polymerization of gaseous polymerizable alpha, beta-ethylenically unsaturated monomer component.

EXAMPLE A

A salt of a carboxylic acid group-containing acrylic polymer was prepared from the following mixture of ingredients:

| Ingredient | Parts by weight (in grams) | |
|---|---|---|
| Feed A | | |
| Acrylic acid | 160.9 | |
| N—butoxymethylacrylamide | 201.3 | (61.5% active in 75/25 butanol-xylene mixture) |
| Styrene | 121.3 | |
| Ethyl acrylate | 831.7 | |
| Feed X | | |
| Benzoyl peroxide | 15.8 | (78% active) |
| Methyl ethyl ketone | 70.0 | |
| Toluene | 60.0 | |
| Feeds B and C | | |
| t-butyl perbenzoate | 6.0 | |
| 2-butoxyethanol | 6.0 | |

Butanol, 509 grams, was charged to a reactor and heated under a nitrogen atmosphere to reflux. Feeds A and X were added incrementally to refluxing butanol over a three-hour period. At the completion of the additions of Feeds A and X, Feed B was added and the reaction mixture held at reflux for two hours. Feed C was then added and the reaction mixture held at reflux for an additional two hours. The reaction mixture was then cooled and vacuum stripped (to remove any remaining unreacted monomers). The reaction mixture was then neutralized (54 percent total theoretical neutralization) by adding 73.5 grams of 28 percent aqueous ammonia and 73.5 grams of deionized water to the reaction mixture. The ammonia addition was beneath the surface and at a temperature of 68° C. The reaction mixture was held at 68° C. for 15 minutes followed by the addition of 1642.5 grams of deionized water. The reaction mixture was held at 70° C. for an additional 30 minutes and then cooled to room temperature. The resultant reaction mixture had a solids content (measured at 150° C.) of about 34 percent. The acrylic polymer had a weight average molecular weight (Mw) of 48,082 as determined by gel permeation chromatography using a polystyrene standard.

EXAMPLE B

A salt of a carboxylic acid group-containing acrylic polymer similar to Example A was prepared from the following mixture of ingredients.

| Ingredient | Parts by weight (in grams) |
|---|---|
| Initial Reactor Charge | |
| Butanol | 667.0 |
| Ethyl acetate | 351.0 |
| Feed A | |
| Ethyl acrylate | 1769.9 |
| Methyl methacrylate | 371.3 |
| Acrylic acid | 334.2 |
| Feed X | |
| Methyl ethyl ketone | 140.0 |
| Toluene | 120.0 |
| Benzoyl peroxide | 23.8 (78% active) |
| Feed B | |
| 28% aqueous ammonia | 225.5 |
| Deionized water | 147.0 |
| Feed C | |
| Deionized water | 3285.0 |
| Feed D | |
| Deionized water | 2400.0 |

The procedure for preparing the acrylic polymer, neutralizing the polymer and dispersing the acrylic polymer salt in water is as generally described in Example A. The resultant dispersion had a solid content of about 28 percent. The polymer had a Mw of 36,201.

EXAMPLE C

A third salt of a carboxylic acid group-containing acrylic polymer similar to Examples A and B was prepared from the following mixture of ingredients:

| Ingredient | Parts by weight (in grams) |
|---|---|
| Initial Reactor Charge | |
| Butanol | 1018.0 |
| Feed A | |
| Acrylic acid | 990.2 |
| Methyl methacrylate | 742.6 |
| Ethyl acrylate | 742.6 |
| Feed X | |
| Methyl ethyl ketone | 140.0 |
| Toluene | 120.0 |
| Benzoyl peroxide | 63.2 (78% active) |
| Feeds B and C | |
| 2-butoxyethanol | 12.0 |
| t-butyl perbenzoate | 12.0 |
| Feed D | |
| 28% aqueous ammonia | 710.8 |
| Deionized water | 147.0 |
| Feed E | |
| Deionized water | 3285.0 |

The procedure for preparing the acrylic polymer, neutralizing the polymer and dispersing the acrylic polymer salt in water is as generally described in Example A. The resultant dispersion had a solids content of about 35 percent. The polymer had a Mw of 25,642.

EXAMPLES 1-5

The following examples show the preparation, by aqueous latex polymerization techniques, of various vinyl chloride and vinylidene chloride polymers and copolymers in the presence of salts of carboxylic acid group-containing acrylic polymers of Examples A, B and C. The examples show the importance of pre-emulsifying the monomer prior to polymerization and then adding the pre-emulsified monomer charge incrementally to the reactor for polymerization.

For all the examples, the polymerizations were conducted in a sealed reactor equipped with an agitator, a means for heating, cooling and purging with inert gas. In general, a reactor charge comprising a dispersion of the acrylic polymer salt and deionized water was first charged to the reactor, followed by the incremental addition of the monomers and the catalyst. In Examples 1 and 3, the gaseous monomer, vinyl chloride, was added to the reactor neat, i.e., without pre-emulsification. When the pressure increased to about 150 psig, the monomer addition was stopped until the pressure decreased and then monomer addition was continued.

In the remaining examples, the gaseous monomer or mixture of monomers were pre-emulsified prior to their addition to the reactor. In these examples, the pressure in the reactor did not exceed 150 psig and pre-emulsified monomer component could be added continuously to the reactor without stoppage. As a result, the reaction was completed much more quickly than in Examples 1 and 3, and it was also found that the resultant polymeric latex had improved properties over the latex of Examples 1 and 3.

EXAMPLE 1

In this example, gaseous vinyl chloride was homopolymerized in the presence of the acrylic polymer salt of Example A as follows:

| Ingredient | Parts by Weight (in grams) |
|---|---|
| Reactor Charge | |
| Acrylic polymer of Example A | 1500 (33% solids) |
| Deionized water | 1200 |
| Monomer Charge | |
| Vinyl chloride | 495 |
| Catalyst Charge | |
| Ammonium persulfate | 8 |
| Deionized water | 72 |

The reactor charge was added to the reactor and heated to 70° C. over 20 minutes. Seventy (70) grams of the catalyst solution was then added to the reactor and the vinyl chloride monomer was added slowly (200 grams/hour) and incrementally to the reactor while maintaining the pressure below 150 psig. The vinyl chloride addition was completed in 5½ hours with intermittent stops because of excessive pressure build-up in the reactor. If addition were continuous, the vinyl chloride addition would have been completed in about 2½ hours. Also, during addition of the vinyl chloride, 10 grams of catalyst solution were added. After completion of the vinyl chloride addition, the temperature of the reactor was then raised to 78° C. and held at this temperature for about 2 hours to complete the polymerization. The latex was cooled to room temperature, the reactor vented and the latex removed from the reactor and vacuum stripped to remove residual vinyl chloride. The latex had a solids content of 30.3 percent and a Mw of 39,432 as determined by gel permeation chromatography using a polystyrene standard.

The latex was formulated into a film-forming composition with dimethylethanolamine and the viscosity adjusted with water to 35 seconds as measured with a No. 4 Ford cup. The latices were then drawn down over aluminum panels and cured by heating to a peak metal temperature of 420° F. (216° C.) in 25 seconds to form films having a dry film thickness of 0.35 mils. The film was cloudy. The cured film was then evaluated for impact resistance by the Wedge Bend test. This test is conducted by first coating a 4½×1½ inch aluminum panel and bending the coated panel in the long direction over a ¼-inch mandrel. The folded panel is then impacted (2000 gram weight dropped 12 inches) to form a wedge shaped bend, i.e., flat at one end, ¼ inch at the other end. The test panel is then immersed in acidified (3 percent HCl) saturated CuSO₄ solution for 2 minutes to stain any breaks in the film. The crack in the film measured from the flat end in millimeters (mm) is recorded. In this example, there was complete delamination of the film.

EXAMPLE 2

In this example, vinyl chloride was homopolymerized in the presence of the acrylic polymer salt of Example A. The vinyl chloride was pre-emulsified prior to polymerization and then added continuously and incrementally to the reactor for polymerization.

| Ingredient | Parts by Weight (in grams) |
|---|---|
| Reactor Charge | |
| Ammonium persulfate | 10.61 |
| Deionized water | 500 |
| Pre-emulsified Vinyl Monomer Charge | |
| Acrylic polymer salt of Example A | 2250 (25.7% solids) |
| Vinyl chloride | 597.5 |
| Deionized water | 471.92 |

The vinyl chloride was pre-emulsified by pumping it into a solution of the acrylic polymer salt and deionized water. The vessel containing the pre-emulsified vinyl monomer charge was kept at 80 psig using inert gas. The reactor charge and 400 grams of the pre-emulsified monomer charge were added to the reactor and heated to 70° C. over a 20-minute period. The remaining portion (2600 grams) of the pre-emulsified monomer feed was added continuously to the reactor over a 3-hour period with the pressure in the reactor not exceeding 80 psig. The temperature of the reactor was then raised to 78° C. and held for about 2 hours to complete the polymerization. The latex was cooled to room temperature and recovered as described in Example 1. When the latex was applied as a film and given the Wedge Bend test as described in Example 1, the cured film was clear and the Wedge Bend was 100 mm.

EXAMPLE 3

In this example, vinyl chloride was copolymerized with glycidyl methacrylate (98:2 weight ratio) in the presence of the acrylic polymer salt of Example C as follows:

| Ingredient | Parts by weight (in grams) |
|---|---|
| Reactor Charge | |
| Acrylic polymer salt of Example C | 983.1 (35% solids) |
| Deionized water | 1900.4 |
| Glycidyl methacrylate | 10.05 |
| Monomer Charge | |
| Vinyl chloride | 525 |
| Catalyst Charge | |
| Ammonium persulfate | 5 |
| Deionized water | 45 |

The reactor charge was added to the reactor and heated to 70° C. over 20 minutes. The catalyst charge was added incrementally to the reactor at the rate of 200 grams/hour. Simultaneously, the vinyl chloride charge was initiated and added incrementally to the reactor at the rate of 200 grams/hour. After about 30 minutes of vinyl chloride addition, the pressure within the reactor increased to 154 psig and the vinyl chloride addition was stopped. When the pressure in the reactor dropped to 136 psig, the vinyl chloride addition was continued at the rate of 100 grams/hour. After about 3½ hours of vinyl chloride addition, the pressure within the reactor was increasing rapidly such that the vinyl chloride addition had to be stopped with 82 grams of vinyl chloride yet to be added. The reaction was terminated and the latex was cooled and recovered as described in Example 1 and found to be very viscous and required thinning with an additional 1000 grams of deionized water so as to be handleable.

EXAMPLE 4

In this example, vinyl chloride was copolymerized with glycidyl methacrylate (98:2 weight ratio) in the presence of the acrylic polymer salt of Example C. The vinyl chloride was pre-emulsified with the glycidyl methacrylate prior to polymerization and then added continuously and incrementally to the reactor for polymerization.

| Ingredient | Parts by weight (in grams) |
|---|---|
| Pre-emulsified Monomer Charge | |
| Acrylic polymer salt of Example C | 1087.57 (35% solids) |
| Deionized water | 1629.43 |
| Vinyl chloride | 577.50 |
| Glycidyl methacrylate | 11.55 |
| Catalyst Charge | |
| Ammonium persulfate | 5 |
| Deionized water | 500 |

The glycidyl methacrylate was pre-emulsified by adding it to a solution of the acrylic polymer and deionized water. The vinyl chloride was then pumped into the tank containing the pre-emulsified glycidyl methacrylate. Four hundred (400) grams of the pre-emulsified monomer charge was then added to the reactor along with the catalyst charge. The ingredients in the reactor were heated to 70° C. over 20 minutes, followed by the incremental addition of the remaining portion of the pre-emulsified monomer charge at the rate of 900 cc/hour. The addition was continuous with the pressure rising no higher than 113.5 psig. Addition was complete in about three hours. The reaction mixture was then heated to 78° C. and held for two hours to complete the polymerization. The latex was cooled and recovered as described in Example 1 and found to be very fluid and easy to handle.

EXAMPLE 5

In this example, 89.5 percent by weight vinyl chloride was copolymerized with 0.5 percent by weight glycidyl methacrylate and 10 percent by weight vinyl acetate as follows:

| Ingredient | Parts by Weight (in grams) |
| --- | --- |
| Reactor Charge | |
| Ammonium persulfate | 4.28 |
| Deionized water | 500 |
| Pre-Emulsified Monomer Charge | |
| Acrylic polymer salt of Example B | 1200.2 (33.7% solids) |
| Vinyl acetate | 94.3 |
| Glycidyl methacrylate | 4.71 |
| Deionized water | 1156.20 |
| Vinyl chloride | 844.2 |

The vinyl acetate and glycidyl methacrylate were pre-emulsified by adding them to a solution of the acrylic polymer and deionized water. The vinyl chloride was then pumped into the tank containing the pre-emulsified vinyl acetate and glycidyl methacrylate. When all the vinyl chloride had been pumped into the tank containing the other pre-emulsified monomers, 400 grams of the pre-emulsified monomer charge were then added to the reactor along with the reactor charge. The ingredients in the reactor were heated to 70° C. over 20 minutes, followed by the incremental addition of 2600 grams of the remaining pre-emulsified monomer charge which was completed in a period of about 3 hours. During the addition of the pre-emulsified monomer charge, the temperature of the reactor was kept at 70° C. and the pressure remained below 85 psig. At the completion of the addition of the pre-emulsified monomer charge, the reactor was heated to 78° C. and held for 2 hours to complete the polymerization. The resulting latex was then cooled and recovered as described in Example 1. The latex had a solids content of 34.8 percent and was fluid and easy to handle. When the latex was applied as a film as described in Example 1, the cured film was clear.

The results of the testing in Examples 1-5 show that pre-emulsifying the polymerizable alpha, beta-ethylenically unsaturated monomers prior to polymerization results in a faster reaction without pressure build-up. Further, the latices prepared with the pre-emulsified monomers are less viscous, have higher molecular weights and improved coating properties.

We claim:

1. A process for preparing a latex polymer which comprises subjecting a gaseous polymerizable alpha, beta-ethylenically unsaturated monomer component to free radical initiated, emulsion polymerization conditions in aqueous medium in the presence of a polymeric surfactant which is a salt of an acid group-containing polymer, comprising pre-emulsifying the monomer component with surface active agent in aqueous phase prior to polymerization and adding the pre-emulsified monomer component incrementally to a reactor for emulsion polymerization.

2. The process of claim 1 in which the polymerizable alpha, beta-ethylenically unsaturated gaseous monomer component is present in the pre-emulsion in an amount of about 10 to 70 percent by weight based on total weight of monomer component and surface active agent.

3. The process of claim 1 in which the monomer component is pre-emulsified with the salt of the acid group-containing polymer.

4. The process of claim 3 in which the polymeric surface active agent is present in the pre-emulsion in an amount of about 10 to 80 percent by weight based on total weight of monomer component and polymeric surface active agent.

5. The process of claim 1 in which the gaseous monomer is selected from the class consisting of vinyl chloride, vinylidene fluoride and mixtures thereof.

* * * * *